UNITED STATES PATENT OFFICE.

CHARLES J. EAMES, OF NEW YORK, N. Y.

REDUCING ORE.

SPECIFICATION forming part of Letters Patent No. 404,184, dated May 28, 1889.

Application filed February 7, 1889. Serial No. 299,032. (No model.)

*To all whom it may concern:*

Be it known that I, CHARLES J. EAMES, a citizen of the United States, residing at New York city, in the State of New York, have invented certain new and useful Improvements in Reducing Ores; and I hereby declare the following to be a full, clear, and exact description of the same, such as will enable others skilled in the art to apply the invention.

My present invention relates to what is termed the "direct process" for the manufacture of iron and steel, or that class of processes wherein sponge is produced by subjecting mixtures of broken ore and the reducing agent, with or without a flux, to substantially a cherry-red heat in hearths, reverberatory furnaces, and like chambers until deoxidation has occurred.

Heretofore the ore and reducing agent have commonly been reduced to nut size, and sometimes to granular form, in which condition they were mixed in suitable proportions, sometimes with and sometimes without a flux; but the results have not been all that could be desired, because of the great waste of reducing agents and the running together or matting of the semi-fused mass, which could not be considered a true sponge and could not be advantageously worked by the subsequent steps required for the manufacture of iron and steel. Moreover, where fusion occurred in the mixtures containing fluxes, the metal subsequently worked dry or brittle in the rolls. Further, where the granulated ore and reducing agent, either with or without flux, has been molded into lumps or bricks, as has been sometimes attempted, the reduction has been irregular and imperfect, the outer portions of the lump or brick being reduced and even fused, while the interior remained raw or unreduced, so that no commercially-valuable sponge was obtained.

My present invention, generally stated, consists in subjecting a stratum composed of pulverized iron ore and reducing agent in proper proportions in the form of a moist and plastic mass to the action of suitable heat in a reverberatory furnace or suitable hearth, whereby the mass is rendered porous and spongy in the process of reduction, and at the same time the reducing agent is measurably protected, so that no undue proportion thereof is burned up or wasted.

In carrying out my invention any suitable reducing or deoxidizing agent may be employed—as, for instance, graphitic carbon such as is found at Cranston, Rhode Island, and elsewhere, coke, coal, carbon residuum from distillation, charcoal, or any other of the many known forms which will at once suggest themselves to those skilled in the art of metallurgy.

The reducing agent, as above, is ground or otherwise finely comminuted. The ore to be treated is also ground, the same as is now commonly done in preparing fix for puddling and other furnaces. The ground or pulverized ore and reducing agent are then mixed in the proportions commonly employed—say from twenty (20) to forty (40) per cent. of reducing agent to the batch—and the whole worked into a plastic mass by grinding together or otherwise. To render the mass plastic, water alone will suffice, though petroleum may be used, either refined or crude, or the residuum from the distillation of crude petroleum, which contains paraffine, or paraffine in solution, in fact any fluid which will not interfere with the deoxidizing process. I prefer, however, to use two or more liquids which distill at different temperatures in order to preserve the porosity or spongy condition of the mass throughout the process. The preferred liquids for rendering the mass plastic are paraffine or crude petroleum from one (1) to four (4) per cent. and water sufficient, when used in conjunction therewith, to bring the mass of ground ore and reducing agent to a rather stiff mortar, or one which can be readily spread.

Any suitable furnace may be used and may have a sand bottom or one of ore fix, though I prefer a reverberatory furnace having a carbon bottom constructed from lumps of graphitic carbon or coke and a filling and cement of reduced ore.

On the bottom of the furnace I spread a stratum or layer of the moist and plastic mass composed substantially as hereinbefore specified, charging the same into the furnace and leveling it off until a layer varying from one (1) to three (3) inches in thickness is obtained, accordingly as it is desired to work the process more or less rapidly. The furnace is then worked with a neutral flame, and preferably at about a dull red or between a dull and a cherry red, the temperature being allowed to rise gradually until the final stage of the process is reached. The gradual volatilization or distillation of the contained fluids will first render the whole mass porous, and so maintain it until the close of the process, and the porosity of the mass, together with the comminuted condition of the ore and reducing agent, present the most favorable conditions for the deoxidation of the ore. At the close of the process, which will be found to be much shorter than that of the processes now practiced, the heat may be slightly raised, so as to facilitate the balling of the mass, and the mass of deoxidized ore or sponge can be balled, withdrawn from the furnace, and hammered, squeezed, or taken directly to an open-hearth furnace and melted into steel.

Having thus described my invention, what I claim, and desire to secure by Letters Patent, is—

1. As an improvement in the art of carbonaceous reducing ore, subjecting a moist or plastic mass of admixed pulverized iron ore and a reducing agent to a reducing heat in a reverberatory or other suitable furnace, substantially as and for the purposes specified.

2. As an improvement in the art of reducing ore, subjecting a mixture of pulverized ore and a carbonaceous reducing agent which has been rendered moist or plastic by the addition of two fluids which distill or vaporize at different temperatures to a suitable reducing heat, substantially as and for the purposes specified.

3. As an improvement in the art of reducing ore, subjecting a moist or plastic mixture of pulverized ore and a carbonaceous reducing agent, to which has been added paraffine or crude petroleum residuum and water, to the action of a reducing heat in a suitable furnace, substantially as and for the purposes specified.

In testimony whereof I affix my signature, in presence of two witnesses, this 6th day of February, 1889.

CHARLES J. EAMES.

Witnesses:
F. W. RITTER, Jr.,
S. A. TERRY.